(12) United States Patent
Devitt et al.

(10) Patent No.: US 11,054,545 B2
(45) Date of Patent: *Jul. 6, 2021

(54) TECHNIQUES FOR OPTIMALLY SENSING FULL CONTAINERS

(71) Applicant: OnePlus Systems, Inc., Northbrook, IL (US)

(72) Inventors: Seamus Devitt, Malahide (IE); Brendan Walsh, Mt Merrion (IE)

(73) Assignee: OnePlus Systems, Inc., Northbrook, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/658,900

(22) Filed: Oct. 21, 2019

(65) Prior Publication Data

US 2020/0116892 A1 Apr. 16, 2020

Related U.S. Application Data

(63) Continuation of application No. 15/606,758, filed on May 26, 2017, now Pat. No. 10,451,768.

(60) Provisional application No. 62/342,215, filed on May 27, 2016.

(51) Int. Cl.
*G01V 8/12* (2006.01)
*B65F 1/16* (2006.01)

(52) U.S. Cl.
CPC ............... *G01V 8/12* (2013.01); *B65F 1/16* (2013.01); *B65F 2210/1443* (2013.01); *B65F 2210/168* (2013.01)

(58) Field of Classification Search
CPC .... G01V 8/10; G01V 8/12; B65F 1/16; B65F 2210/1443; B65F 2210/144; B65F 2210/168; G05B 2219/45083; G06N 3/008; A61B 19/22; A61B 19/5212; B25J 13/085
See application file for complete search history.

(56) References Cited

U.S. PATENT DOCUMENTS

| | | | |
|---|---|---|---|
| 2,125,122 A | 7/1938 | Mongiello |
| 3,299,418 A | 1/1967 | Treseder |
| 3,558,181 A | 1/1971 | Peterson |
| 3,779,419 A | 12/1973 | Heitz |
| 3,884,520 A | 5/1975 | Peterson |
| 3,901,541 A | 8/1975 | Peterson |
| 4,235,165 A | 11/1980 | Fenner et al. |

(Continued)

FOREIGN PATENT DOCUMENTS

| | | |
|---|---|---|
| AT | 12619 U2 | 9/2012 |
| CA | 1138491 | 12/1982 |

(Continued)

OTHER PUBLICATIONS

Trash Monitoring System Offered, PR Newswire, Jul. 29, 1985. Abstract only.

(Continued)

*Primary Examiner* — John R Lee
(74) *Attorney, Agent, or Firm* — McAndrews Held & Malloy, Ltd.

(57) ABSTRACT

A series of techniques incorporated in two sensing methods that enable fullness detection whilst minimizing the current consumption of the battery operated wireless electronic circuitry that implements the detection.

19 Claims, 5 Drawing Sheets

(56) References Cited

U.S. PATENT DOCUMENTS

| | | |
|---|---|---|
| 4,391,188 A | 7/1983 | Gwathney et al. |
| 4,424,740 A | 1/1984 | Gwathney et al. |
| 4,753,367 A | 6/1988 | Miller et al. |
| 5,016,197 A | 5/1991 | Neumann et al. |
| 5,025,721 A | 6/1991 | Spiers |
| 5,044,271 A | 9/1991 | Robbins et al. |
| 5,119,894 A | 6/1992 | Crawford et al. |
| 5,178,062 A | 1/1993 | Spiers |
| 5,214,594 A | 5/1993 | Tyler et al. |
| 5,247,880 A | 9/1993 | Robbins |
| 5,297,481 A | 3/1994 | Robbins et al. |
| 5,299,142 A | 3/1994 | Brown et al. |
| 5,303,642 A | 4/1994 | Durbin et al. |
| 5,330,307 A | 7/1994 | Spiers et al. |
| 5,353,698 A | 10/1994 | Robbins |
| 5,415,086 A | 5/1995 | Robbins |
| 5,532,928 A | 7/1996 | Stanczyk et al. |
| 5,575,201 A | 11/1996 | Fenner et al. |
| 5,712,789 A | 1/1998 | Radican |
| 5,746,378 A | 5/1998 | Beadle et al. |
| 5,892,441 A | 4/1999 | Woolley et al. |
| 5,922,040 A | 7/1999 | Prabhakaran |
| 5,960,402 A | 9/1999 | Embutsu et al. |
| 6,068,440 A | 5/2000 | Lang et al. |
| 6,138,557 A | 10/2000 | Brown et al. |
| D450,062 S | 11/2001 | Spiers |
| 6,336,362 B1 | 1/2002 | Duenas |
| 6,366,829 B1 | 4/2002 | Wallace |
| 6,418,841 B1 | 7/2002 | Little et al. |
| 6,427,585 B1 | 8/2002 | Brown et al. |
| 6,598,094 B1 | 7/2003 | Wollrath et al. |
| 6,919,803 B2 | 7/2005 | Breed |
| 7,212,098 B1 | 5/2007 | Trent et al. |
| 7,221,746 B1 | 5/2007 | Onken et al. |
| D564,545 S | 3/2008 | Poss et al. |
| 7,389,724 B2 | 6/2008 | Seagraves et al. |
| 7,690,296 B2 | 4/2010 | Seagraves et al. |
| 7,690,297 B1 | 4/2010 | Sagen et al. |
| 7,783,380 B2 | 8/2010 | York et al. |
| 7,819,054 B2 | 10/2010 | Cunningham et al. |
| 8,068,110 B2 | 11/2011 | Li et al. |
| 8,096,235 B2 | 1/2012 | Cunningham et al. |
| 8,479,648 B2 | 7/2013 | Lyle et al. |
| 8,742,926 B2 | 6/2014 | Schnittman et al. |
| 10,451,768 B2 * | 10/2019 | Devitt .................. B65F 1/02 |
| 2002/0123914 A1 | 9/2002 | Kane et al. |
| 2003/0226884 A1 | 12/2003 | Swider et al. |
| 2011/0137484 A1 | 6/2011 | Poss et al. |
| 2012/0169497 A1 | 7/2012 | Schnittman et al. |
| 2013/0276646 A1 | 10/2013 | Lyle et al. |
| 2013/0278067 A1 | 10/2013 | Poss et al. |
| 2015/0066782 A1 | 3/2015 | Vainberg et al. |
| 2016/0050514 A1 | 2/2016 | Skocypec et al. |
| 2017/0090447 A1 | 3/2017 | Skocypec et al. |
| 2017/0363769 A1 | 12/2017 | Devitt et al. |

FOREIGN PATENT DOCUMENTS

| | | |
|---|---|---|
| CA | 2667198 A1 | 5/2008 |
| CA | 2806876 A1 | 2/2012 |
| CA | 2891813 A1 | 5/2014 |
| DE | 4211119 A1 | 10/1992 |
| EP | 1708602 | 10/2006 |
| ES | 2365616 | 3/2006 |
| WO | 199945761 A1 | 9/1999 |
| WO | WO2000063864 A1 | 10/2000 |
| WO | WO2001097555 A3 | 12/2001 |
| WO | WO2008154475 A1 | 12/2008 |
| WO | WO2014099190 A1 | 6/2014 |
| WO | WO2014114469 A2 | 7/2014 |
| WO | WO2014114470 A1 | 7/2014 |
| WO | WO2015120462 A2 | 8/2015 |
| WO | WO2015120463 A1 | 8/2015 |
| WO | 2015/175763 | 11/2015 |

OTHER PUBLICATIONS

Thomas La Porta, et al., Sensor-Mission Assignment in Rechargeable Wireless Sensor Networks, ACM Transactions on Sensor Networks. No Date Given.

Thomas La Porta, et al., "Sensor-Mission Assignment in Wireless Sensor Networks with Energy Harvesting," Conference Paper, 2011 8th Annual IEEE Communications Society Conference on Sensor, Mesh and Ad Hoc Communications and Networks, Jun. 2011.

FAQs—SmartBin from www.smartbin.com, Jul. 24, 2010. Pulled from http://web.archive.org/web/20100724232902/http:/www.smarbin.com/en/support/faqs.html. Nov. 28, 2016.

Specification Summary—SmartBin from www.smartbin.com, Jul. 24, 2010. Pulled from http://web.archive.org/web/20100724232747/http:/www.smarbin.com/en/how-it-works/sensor-specitications.html. Nov. 28, 2016.

Int'l Search Report and Written Opinion dated Aug. 24, 2017 for PCT/US2017/034727.

Joaquim Oller et al: "Performance Evaluation and Comparative Analysis of SubCarrier Modulation Wake-up Radio Systems for Energy-Efficient Wireless Sensor Networks", Sensors, vol. 14, No. 1, Dec. 19, 2013 (Dec. 19, 2013), pp. 22-51, XP055608138, DOI: 10.3390/S140100022.

James Mathews et al: "Low Power Wake-Up in Wireless Sensor Networks Using Free Space Optical Communications", Sensor Technologies and Applications (SENS0RC0MM), 2010 Fourth International Conference on, IEEE, Piscataway, NJ, USA, Jul. 18, 2010 (Jul. 18, 2010), pp. 256-261, XP031739504, ISBN: 978-1-4244-7538-4.

European Patent Office, Search Report dated Jan. 31, 2020, Application No. PCT/US2017034727, 14 pates.

* cited by examiner

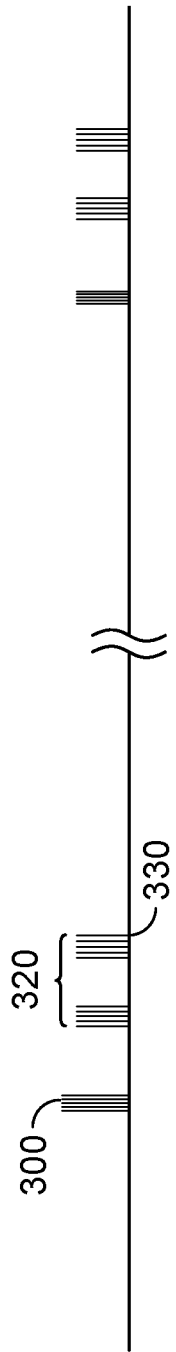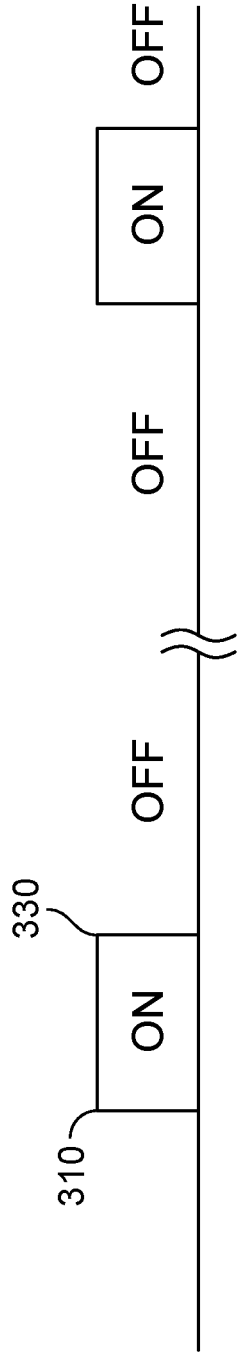
FIG. 3A
FIG. 3B
$$D = \frac{1ms}{3600s} = 0.00000028$$
FIG. 3C

TECHNIQUES FOR OPTIMALLY SENSING FULL CONTAINERS

CROSS REFERENCE TO RELATED APPLICATIONS

This application is a Continuation Patent Application of U.S. Non-Provisional patent application Ser. No. 15/606,758, entitled "Techniques for optimally sensing full containers" filed May 26, 2017, now U.S. patent Ser. No. 10/451,768 and which is a Non-Provisional Patent Application of U.S. Provisional Patent Application No. 62/342,215, entitled "Techniques for optimally sensing full containers" filed May 27, 2016, both of which are herein incorporated by reference in their entirety.

BACKGROUND OF THE INVENTION

The present invention is in the technical field of waste management. More particularly, the present invention is in the technical field of sensing the fullness status of containers.

The fullness of containers used in waste management is an important parameter to measure if it is desired to implement an optimal servicing algorithm. Such fullness information is transmitted to a central repository, where software algorithms can then be implemented to allow the generation of optimal routing schedules for the service vehicles. Sensors that can detect the fullness level are commonplace but these sensors suffer from excessive electrical current consumption.

SUMMARY OF THE INVENTION

The present invention is a series of techniques incorporated in two sensing methods that enable fullness detection whilst minimizing the current consumption of the battery operated wireless electronic circuitry that implements the detection mechanism and wireless communication.

BRIEF DESCRIPTION OF THE DRAWINGS

FIGS. 3A and 3B and 3C are schematic diagrams of the timing particulars of a preferred embodiment of IR Emitter modules of the present invention;

DETAILED DESCRIPTION OF THE INVENTION

Figure 1A:
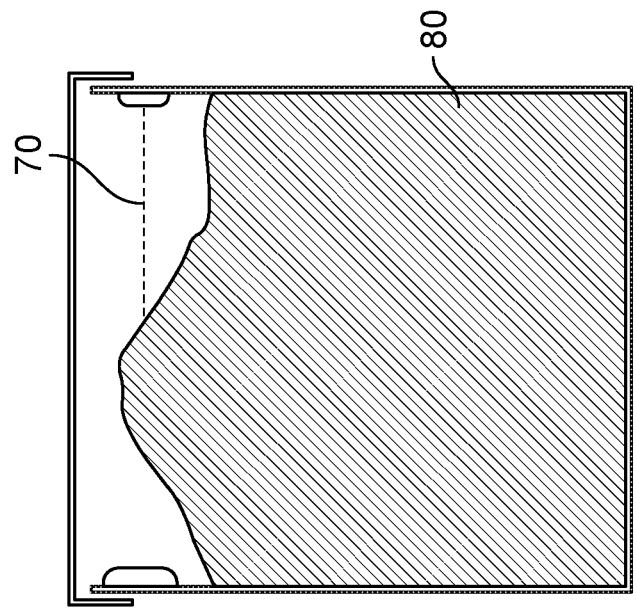
FIGS. 1A and 1B are cross-sectional views of a representative container of the invention.
Figure 1B:
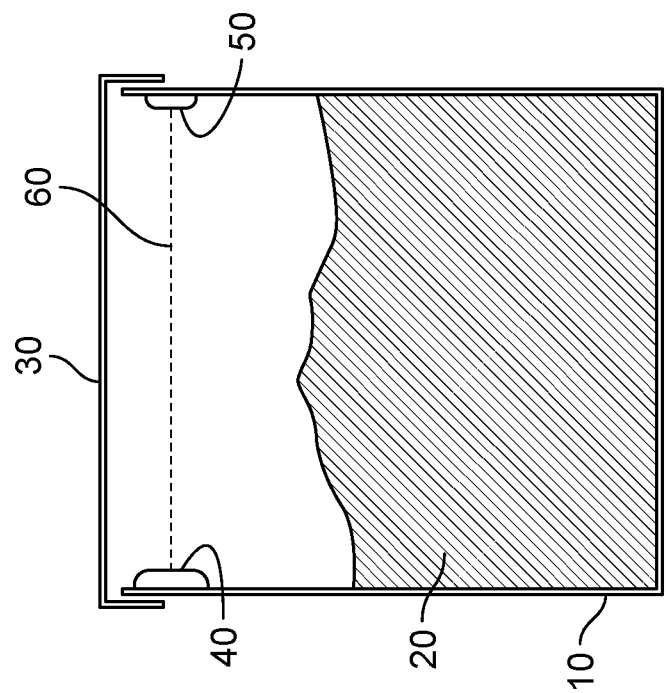

Referring now to the invention in more detail, in FIG. 1 there is shown a container 10 with substantially vertical side walls and a covering lid 30, and containing a quantum of waste material 20. The container is fitted with a pair of sensor modules, consisting of an Infra-Red Emitter module 50 and an Infra-Red Receiver module 40. The Emitter module emits a pulsed beam of near Infra-Red light modulated with a unique coding pattern according to a pre-defined timing schedule. If the container is not full beyond the limit line set by the linear line 60 connecting the emitter and receiver modules, then the unique coding pattern will be received and recognized by the Receiver module and this can be interpreted as an indication that the container is not full. Conversely, if the container is full 80 beyond the limit line set by the linear line connecting the transmitter and receiver elements, then the beam of near Infra-Red light will be blocked 70 and the unique coding pattern will not be received by the Receiver module and this can be interpreted as an indication that the container is full.

Figure 2B:
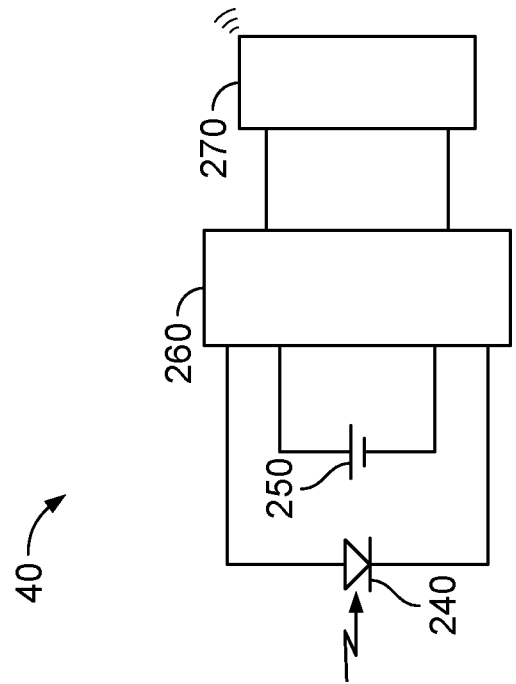
FIGS. 2A and 2B are schematic diagrams of a preferred embodiment of an IR Emitter module of the present invention.
Figure 2A:
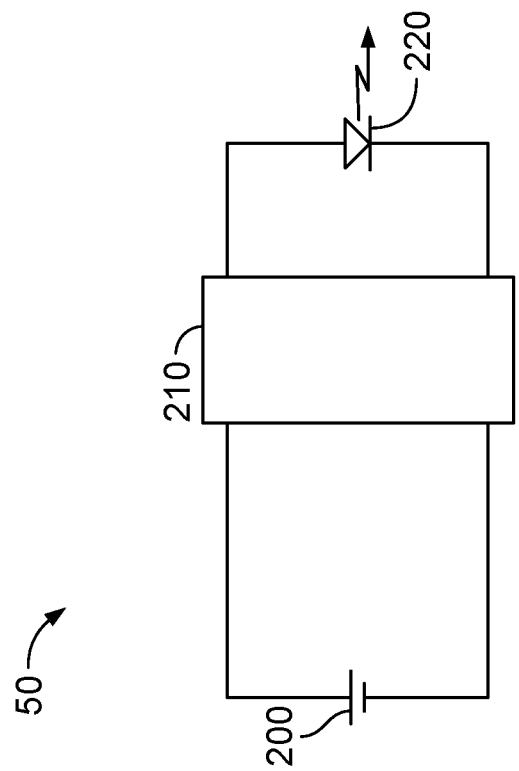

In more detail, still referring to sensing method No. 1, FIG. 2a shows that the Emitter module 50 comprises of a battery 200 and a battery powered microprocessor 210 that controls the coding pattern that is applied to an Infra-Red emitting diode 220 that emits near Infra-Red light that travels across the container and is received (or not received—depending on the fullness level of the container).

In more detail, still referring to sensing method No. 1, FIG. 2b shows that the Receiver module 40 comprises of a battery 250 and a battery powered microprocessor 260 that interprets the coding pattern that is received (or not received—depending on the fullness level of the container) by an Infra-Red Receiver diode 240. The Receiver module also incorporates a wireless communication module 270 that can transmit a summary version of the information received to an Internet cloud based central repository.

Referring now to FIG. 3, there is shown a technique that ensures minimal electrical power consumption for each of the Emitter module and Receiver module. FIG. 3a shows the timing diagram of Emitter module. FIG. 3b shows the timing diagram of the Receiver module. It is to be noted that this method of synchronization of the Emitter module and Receiver module ensures minimal power consumption.

In more details, still referring to FIG. 3 and to FIG. 3a in particular, the first burst of pulses, also to be called the Wake-up Burst 300, is emitted. This has the effect of waking up the Receiver module at point 310. The Receiver module then leaves its standby state of low quiescent current consumption, and is now primed and waiting for a unique modulation code. The Emitter module, after a delay of approx. 500 uSec, then delivers a burst of near Infra-Red pulses 320 than contain a uniquely modulated code. If the Receiver module receives this code, this is confirmation that the container has not yet reached its full state. After a time (typically 1 mSec) the Emitter module turns off at point 330 and remains off (with very low <1 uAmp) quiescent current, until the next cycle which would typically be one hour later.

Referring to FIG. 3c it can be seen that the effective duty cycle of operation may be calculated as approximately 0.00000028, thus guaranteeing an exceptionally low average current draw from the batteries of both the Emitter module and the Receiver module.

Referring now to FIG. 4, sensing method No. 2 is described. This is a technique for detecting the fullness state of a container with hinged lid, as is common in the waste management industry in the form of dumpsters, wheelie bins, etc.

Figure 4A:
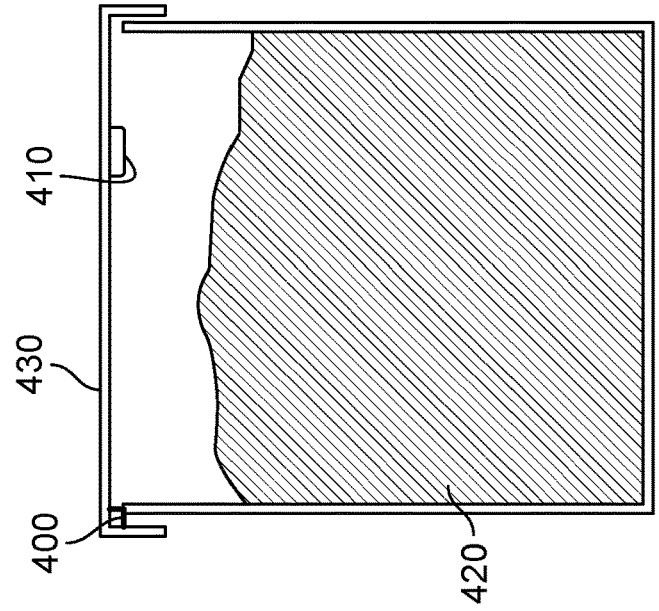
FIGS. 4A and 4B and 4C and 4D are cross-sectional views of a representative container of the invention showing various states of fullness.
Figure 4B:
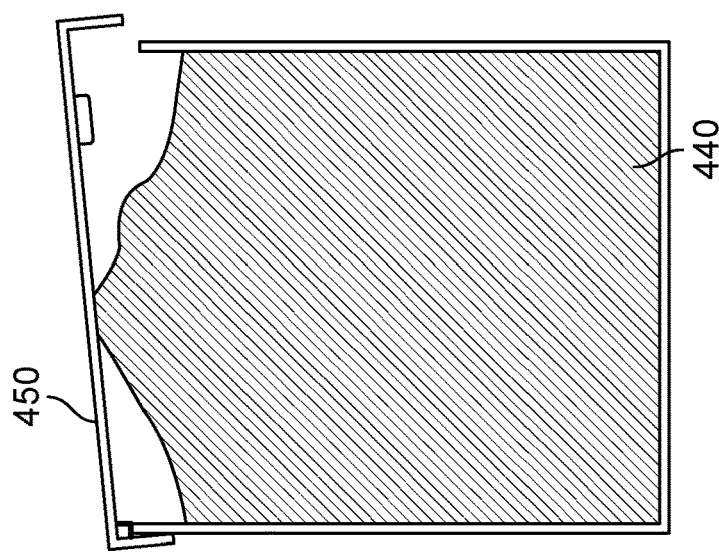
Figure 4C:
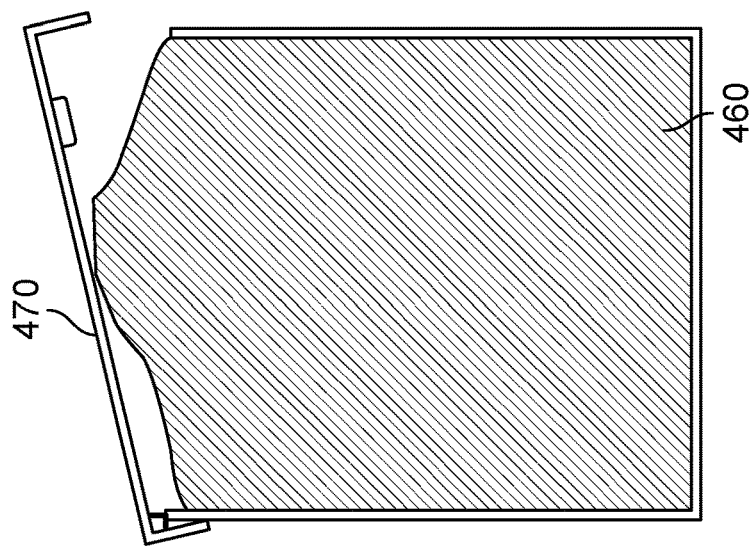

In more detail, still referring to sensing method No. 2, FIG. 4a shows a container with a waste level 420 that is below the full state. Also shown is a lid 430 mounted on a hinge 400 and a battery powered Sensing module 410 that is fitted to the lid 430 (in any position, inside or outside, close to the middle, near the back or near the front). The Sensing module 410 can detect the angle of the resting position of the lid in all 3 orthogonal axes, with the earth's gravitational axis being the primary axis. The Sensing module measures the lid's tilted position at regular frequent intervals and this information is transmitted to a cloud based server. From the information received, the computing server can interpret the normal resting position of the lid, and this information becomes the reference position. When the container is filled to the point where the lid cannot rest at its normal resting angle, as illustrated in FIG. 4b with lid in position 450 and as illustrated in FIG. 4c with lid in position 470, the Sensing module can interpret this as a full container as in FIG. 4b, or as an over-full container as in FIG. 4c.

Figure 4D:
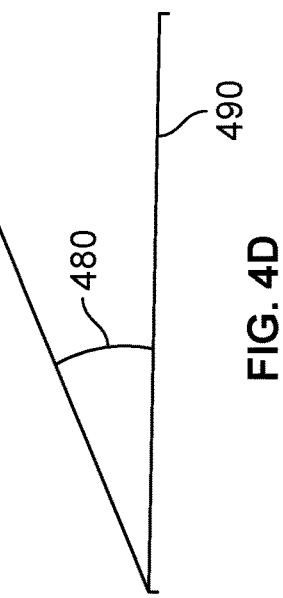

Further, by interpretation of the lid angle 480 and by comparison with the reference resting position 490, as shown in FIG. 4d, it is possible to assess the degree or amount of over-fullness. It should be noted that this technique works also for non-horizontal reference positions.

Optionally the Sensing module 410 may also be fitted with a shock detection measurement device which can be activated by a lid opening act and such lid opening acts may be quantified both in terms of their frequency and also in terms of their amplitude. Such information may be used by the computing server to assess the user activity for the container being monitored.

Figure 5:
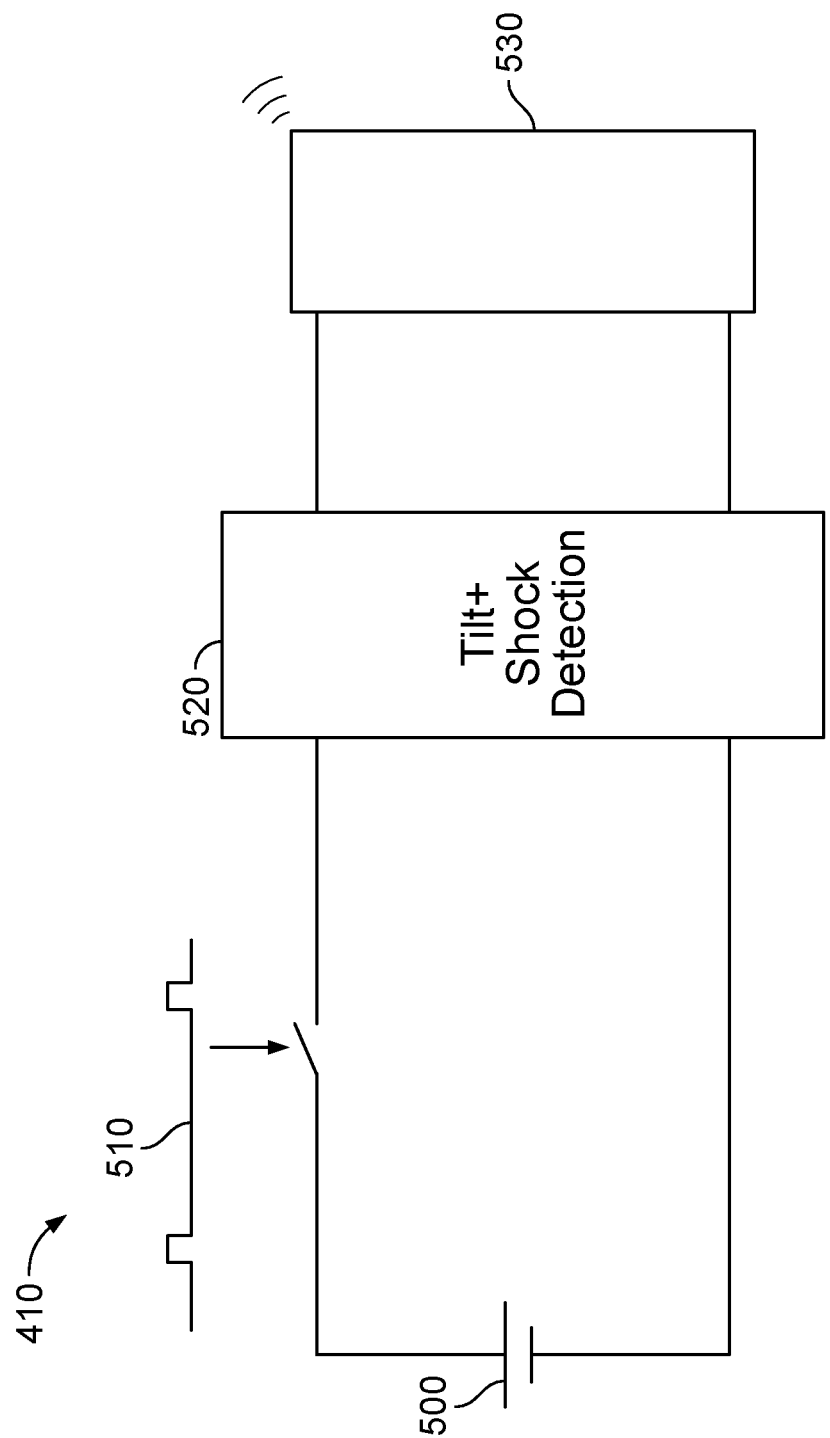
FIG. 5 is a schematic diagram of a sensing module of the present invention.

In more detail, still referring to sensing method No. 2, FIG. 5 shows that the Sensing module 410, comprising a battery 500 and a battery powered microprocessor 520 that detects title angle and shock. The microprocessor is powered according to an activation pattern 520 that ensures both very low duty cycle of operation and minimal on time when activated by a lid opening activation. The Sensing module also incorporates a wireless communication module 530 that can transmit a summary version of the information received to an internet cloud based central repository.

The advantages of the present invention include, without limitation, that the sensing modules used in each embodiment of the invention can use exceedingly low levels of electrical current, and consequently can use batteries of much lower capacity than would otherwise be used. The invention enables detection of full containers with exceedingly small and easily installed Sensing modules. The invention enables the operation of an Infra-Red sensing technique that is immune to erroneous readings. The invention also allows the use of Sensing modules where the positioning of the Sensing module is not critical. The invention further generates valuable data in relation to user activity of such containers. Such information can be fed into service prediction algorithms providing further insight into the operation of important waste container assets.

In broad embodiment, the present invention is a series of techniques that enable low cost and low energy consumption detection of container fullness.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

The invention claimed is:

1. A method for sensing a level of fullness of containers, comprising:
    programming an infra-red (IR) emitter module to emit a wake-up signal and coded signals;
    securing the IR emitter within a container capable of containing waste material and having side walls and an openable lid; and
    securing an IR receiver module within the container, the IR emitter and the IR receiver modules arranged on one or more of the side walls within the container such that a horizontal line between the modules represents a full container;
    automatically placing the IR receiver module into a power saving mode, and
    emitting a wake-up signal by the IR emitter module;
    automatically removing the IR receiver module from the power saving mode by receipt of the wake-up signal emitted by the IR emitter module; and
    determining the level of fullness of the container by receipt or non-receipt of the coded signals by the IR receiving module within a predetermined amount of time after waking up.

2. The method of claim 1, wherein the IR receiver module comprises a wireless communication module.

3. The method of claim 2, further comprising transmitting from the IR receiver summary information corresponding to the level of fullness of the container to a central repository via the wireless communication module.

4. The method of claim 3, wherein the summary information corresponds to the container being full when the coded signals are not received within a predetermined amount of time.

5. The method of claim 3, wherein the summary information corresponds to the container not being full when the coded signals are received within a predetermined amount of time.

6. The method of claim 1, further comprising emitting the wake-up signal and the coded signals from an IR emitting diode of the IR emitter module to the IR receiver.

7. The method of claim 1, further comprising:
    delivering from the IR emitter the wake-up signal as a first IR pulse to the IR receiver module;
    delivering from the IR emitter a second IR pulse containing the coded signal after a predetermined delay following the first IR pulse; and
    entering the IR emitter into the power saving mode after a predetermined amount of time following the second IR pulse.

8. The method of claim 1, further comprising receiving the wake-up signal and the coded signals at an IR receiving diode of the IR receiver module from the IR emitter.

9. A method for sensing a level of fullness of containers, comprising:
    securing a sensing module to an openable lid of a container capable of containing waste material, the operable to:
    automatically placing the sensing module into a power saving mode;
    removing the sensing module from the power saving mode according to a predetermined time interval; and
    detecting an angle of the resting position of the lid, wherein the level of fullness of the container is based on the detected angle of the resting lid.

10. The method of claim 9, wherein the sensing module comprises a wireless communication module.

11. The method of claim 10, further comprising transmitting from the sensing module information corresponding to the detected angle of the resting lid via the wireless communication module to a server.

12. The method of claim 11, further comprising interpreting at the server the information to determine a normal resting angle of the lid.

13. The method of claim 12, further comprising comparing at the server the information corresponding to the detected angle to the normal resting angle to determine a level of fullness of the container.

14. The method of claim 13, wherein the information corresponds to the container being full when the tilt angle is greater than the normal resting angle.

15. The method of claim 13, wherein the information corresponds to the container not being full when the tilt angle is similar to the normal resting angle.

16. The method of claim 9, activating a shock detection measurement device of the sensing module by a lid opening act.

17. The method of claim 16, further comprising:
transmitting from the sensing module information corresponding to the lid opening acts to a server; and
assessing at the server the frequency and amplitude of the lid opening acts.

18. The method of claim 17, further comprising implementing a prediction algorithm at the server to assess user activity based on the assessed frequency and amplitude of the lid opening acts.

19. The method of claim 18, further comprising detecting at the sensor module the angle of the lid in three orthogonal axes, gravitational axis being a primary axis.

\* \* \* \* \*